United States Patent [19]
Arakawa

[11] Patent Number: 4,625,409
[45] Date of Patent: Dec. 2, 1986

[54] GRAPHICS PROTRACTOR
[76] Inventor: Jeanette S. Arakawa, 26889 Nina Pl., Los Altos Hills, Calif. 94022
[21] Appl. No.: 786,878
[22] Filed: Oct. 11, 1985
[51] Int. Cl.$^4$ .............................................. B43L 7/06
[52] U.S. Cl. ...................................... 33/1 N; 33/471
[58] Field of Search ............... 33/1 N, 1 SD, 471, 534

[56] References Cited
U.S. PATENT DOCUMENTS

| | | | |
|---|---|---|---|
| 2,235,177 | 3/1941 | Stark | 33/1 SD |
| 2,364,731 | 12/1944 | Luck | 33/1 SD |
| 2,424,065 | 7/1947 | Stewart | 33/1 N |
| 2,480,914 | 9/1949 | Gallington et al. | 33/471 |
| 2,602,228 | 7/1952 | Webber | 33/1 N |
| 3,844,042 | 10/1974 | Hodge | 33/1 SD |
| 3,925,899 | 12/1975 | Hesse et al. | 33/1 N |
| 4,454,654 | 6/1984 | Mayer | 33/1 N |

FOREIGN PATENT DOCUMENTS 164446  11/1949  Austria ................................ 33/1 N Primary Examiner—Richard R. Stearns
Attorney, Agent, or Firm—Willis E. Higgins; Edward B. Gregg

[57] ABSTRACT

A graphics protractor (10) for placement on a computer display screen (52) to determine direction changes for graphics commands has a circular ring (12) bearing indicia (14) representing relative angles with respect to a point (16) of origin on the ring (12). First and second sheets (18,20) through which display screen (52) is visible are rotatable with respect to the ring (12). The sheets (18,20) each have a straight line (44) movable into and out of registration with respect to the straight line (44) of the other sheet (20,18) by rotation of the sheets (18,20) within the ring (12). The sheets (18,20) have a graphics symbol (28) centrally located with respect to the ring (12), which is placed over a corresponding graphics symbol (50) on the computer display screen (52) to use the protractor (10).

12 Claims, 12 Drawing Figures

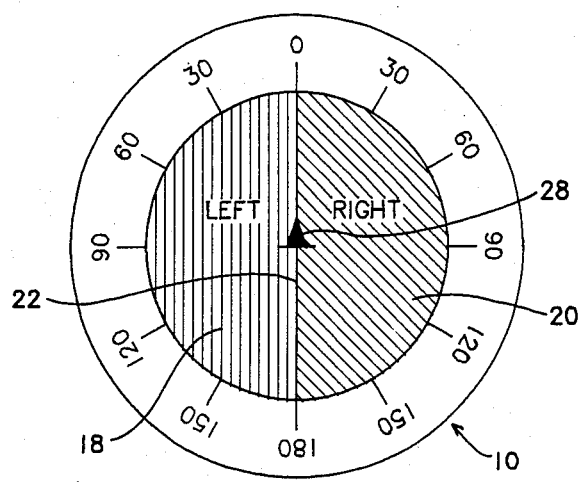
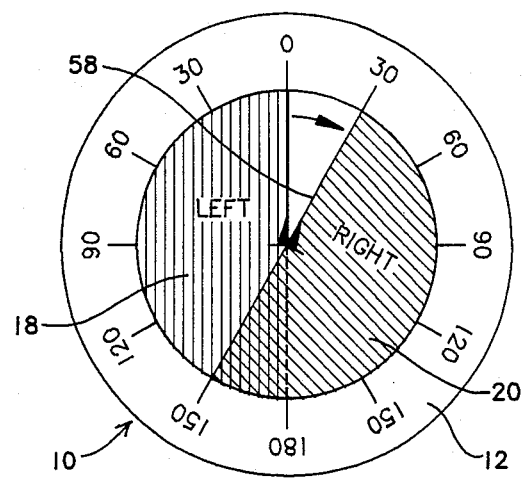
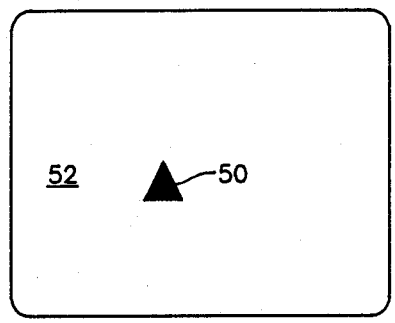
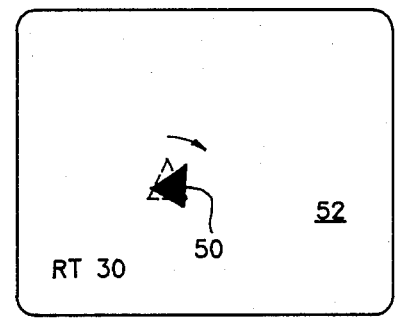
FIG. 5a
FIG. 5b
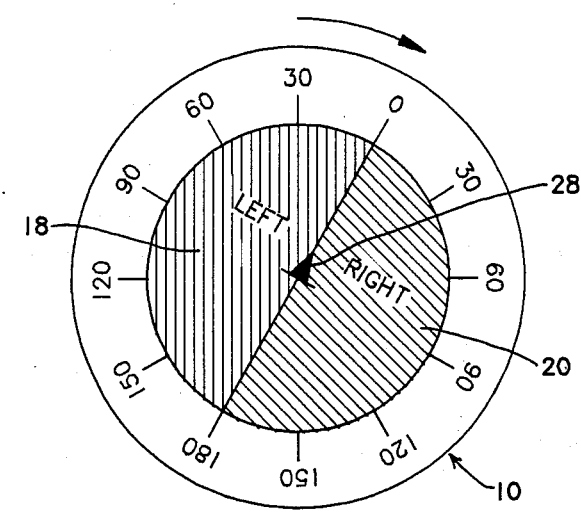
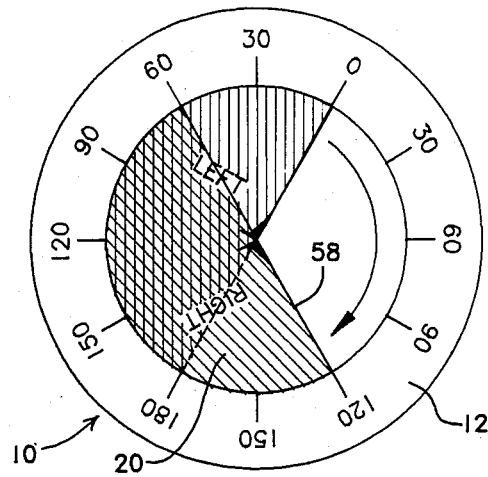
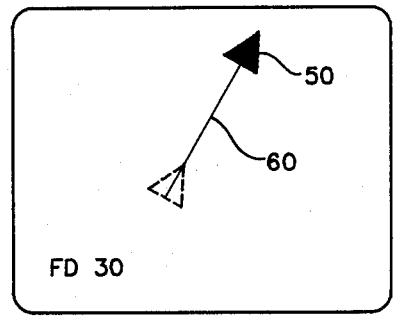
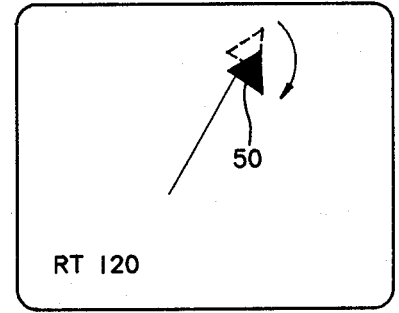
FIG. 5c
FIG. 5d

GRAPHICS PROTRACTOR

BACKGROUND OF THE INVENTION

1. Field of the Invention

This invention relates to a novel device for placement on a computer display screen to determine direction changes for graphics commands. More particularly, it relates to such a device which may be oriented over a graphics symbol on the computer display screen to determine proper orientation and/or translation of the graphics symbol to draw desired patterns on the display screen by means of commands in a graphics language. Most especially, it relates to such a device particularly adapted for use with a computer system running a LOGO graphics language program.

2. Description of the Prior Art

LOGO is a computer graphics programming language that has achieved widespread use, particularly as an educational tool for teaching children and others fundamental principles of computer graphics and geometrical relationships. LOGO utilizes a graphics symbol, called a "turtle", which is oriented and translated on a computer display screen with appropriate commands, to draw patterns on the screen. The turtle is usually represented as a triangular arrowhead. There are two basic commands in the LOGO language: change of direction and change of position. Lateral and angular angular orientation of the turtle on the screen depicts the direction in which a line segment is to be drawn. The turtle is the leading point of any such line segment the computer is instructed to draw.

The orientation of the turtle is measured by the supplements to the inside angles in the desired patterns. For most people, especially children, judging the required laterality and angle for a desired orientation change of the turtle is difficult to do by inspection. Achieving the desired orientation and length of the line segments is usually a trial and error process that makes the use of LOGO commands more difficult than if the laterality, angles and lengths could be better judged.

A wide variety of protractors and similar devices for measuring angles and distances are known in the art. For example, such devices are shown in the following issued U.S. Pat. No. 507,216, issued Oct. 24, 1893 to Colby; U.S. Pat. No. 3,018,552, issued Jan. 30, 1962 to Adams; U.S. Pat. No. 3,203,101, issued Aug. 31, 1965 to Brown; U.S. Pat. No. 3,314,167, issued Apr. 18, 1967 to Allgood; U.S. Pat. No. 3,377,718, issued Apr. 16, 1968 to Savin et al.; U.S. Pat. No. 3,382,591, issued May 14, 1968 to Savin et al.; U.S. Pat. No. 3,492,726, issued Feb. 3, 1970 to Stewart and U.S. Pat. No. 4,057,902, issued Nov. 15, 1977 to Matsui. While the art pertaining to such devices is a well developed one, none of these devices is particularly adapted for use with computer display screens and computer graphics commands.

SUMMARY OF THE INVENTION

Accordingly, it is an object of this invention to provide a device for determining laterality and angle changes necessary to achieve a particular orientation which is especially adapted for use with computer display screens and computer graphics commands.

It is another object of the invention to provide such a device which will aid a user of computer graphics commands to determine both an orientation and a translation distance for a computer graphics symbol which is moved on the computer display screen to draw desired patterns.

It is a further object of the invention to provide such a device which is color coded with colors that have laterality significance.

It is still another object of the invention to provide such a device in which angles both are visually and tactilely represented.

The attainment of these and related objects may be achieved through use of the novel device for placement on a computer display screen to determine direction changes for graphics commands herein disclosed. A graphics protractor in accordance with this invention includes a circular ring bearing indicia representing degrees, preferably both to the left and to the right, around the circumference of the ring relative to a point of origin on the ring. First and second members are rotatable within the ring and through which at least a portion of the computer display is visible. Each of the first and second members has a straight line movable into and out of registration with the straight line on the other of the first and second members by rotation of the first and second members within the ring. The first and second members bear indicia along the straight line corresponding to a graphics symbol centrally located of said ring. The straight lines of the first and second members also preferably additionally bear indicia indicating distance from the indicia corresponding to the graphics symbol, and the device is further usable to determine distances for use in a graphics command for translation of a corresponding graphics symbol on the computer display screen to a desired point on the screen.

In use of the graphics protractor of this invention, the device is placed on the computer display screen with the graphics symbol on the device over and in the same orientation as the corresponding graphics symbol on the display screen. The first or second member is then rotated in the ring to move its straight line out of registration with the straight line of the other first or second member until its straight line passes through a point to which it is desired to translate the graphics symbol on the screen. The angle required to change the orientation of the graphics symbol on the screen to point to the desired point is then read from the angle indicia around the ring. If the distance indicia are provided along the straight lines of the first and second members, the translation distance to the desired point can also be read from those indicia. This device therefore allows angles to change the orientation and/or distances to change the position of the graphics symbol to a desired location to be rapidly and conveniently determined.

The attainment of the foregoing and related objects, advantages and features of the invention should be more readily apparent to those skilled in the art after review of the following more detailed description of the invention, taken together with the drawings, in which:

BRIEF DESCRIPTION OF THE DRAWINGS

FIGS. 5a-5h are plan views further showing use of the computer graphics protractor of FIGS. 1-3.

DETAILED DESCRIPTION OF THE INVENTION

Figure 1:
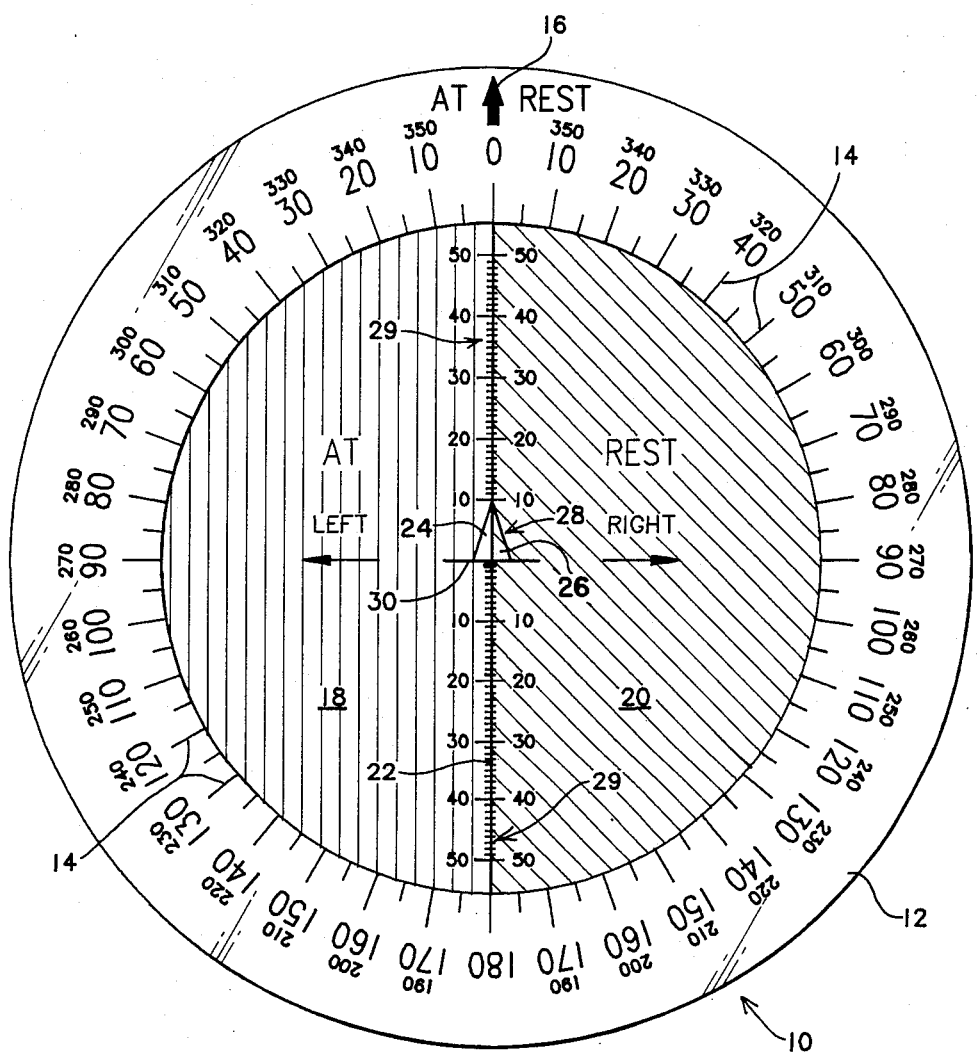
FIG. 1 is a plan view of a computer graphics protractor in accordance with the invention.

Turning now to the drawings, more particularly to FIG. 1, there is shown a computer graphics protractor 10 in accordance with the invention. The protractor 10 has an outer, circular ring 12 with indicia 14 inscribed on the ring 12 representing degrees around the ring relative to point 16 of origin. As shown, the indicia 14 run primarily from 0 to 180 to the left and to the right, with secondary markings continuing to 360 above the primary indicia 14. The point 16 is indicated by the legend "AT REST". First and second colored but transparent sheets 18 and 20 are rotatably mounted in the ring 12. The left hand sheet 18 is colored green, and the right hand sheet 20 is colored red, to correspond to the colors used on position indicator lights for airplanes and ships. The sheets 18 and 20 meet at straight line 22 when they are both in the AT REST position as shown. Each of the sheets 18 and 20 bears half 24 and 26 of a LOGO graphics turtle arrowhead 28. A millimeter scale 29 extends upwards and downwards from base 30 of the LOGO turtle arrowhead 28.

Figure 2:
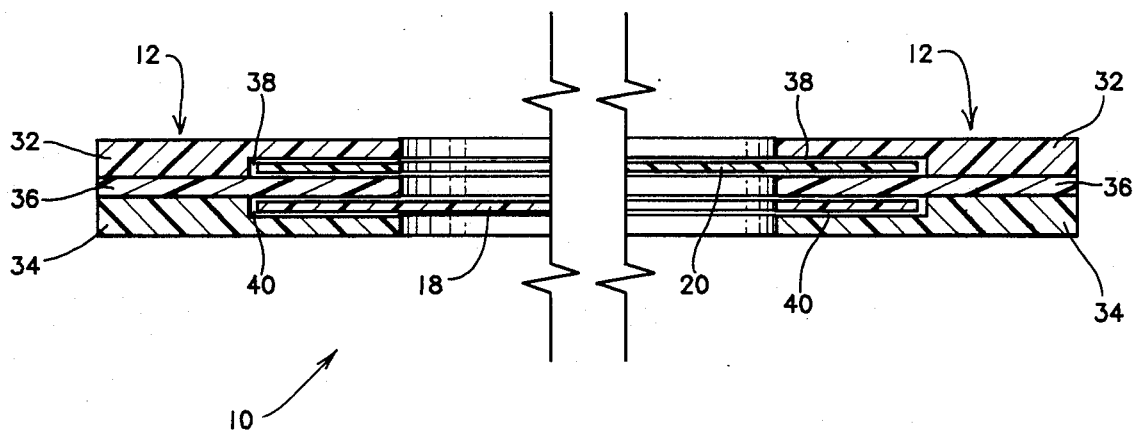
FIG. 2 is a cross-section view, of the computer graphics in FIG. 1.
Figure 3:
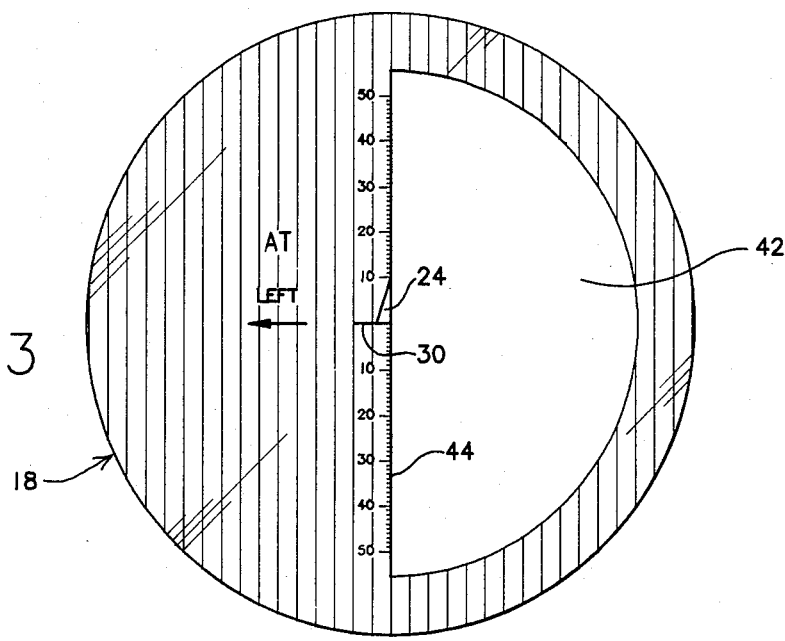
FIG. 3 is a plan view of a portion of the computer graphics protractor in FIGS. 1 and 2.

FIGS. 2 and 3 show construction details of the graphics protractor 10. Ring 12 is formed from top and bottom outer layers 32 and 34, separated by an inner spacer layer 36. Each of the outer layers 32 and 34 has an annular groove 38 and 40 facing the corresponding groove 40 and 38 on the other layer 34 and 32. The left and right hand sheets 18 and 20 are positioned within the resulting slots with sufficient clearance to allow their rotation relative to the ring 12. As is best shown in FIG. 3, the sheet 18 is circular in shape, with a semicircular cutout 42 on its right hand side. Left edge 44 of the cutout 42 corresponds to the line 22 along the sheets 18 and 20 in FIG. 1. Left half 24 of the turtle arrowhead 28 is positioned with its base 30 at the midpoint of edge 44. The right hand sheet 20 has the same construction as the sheet 18, except that its cutout is in the left half of the sheet.

Figure 4:
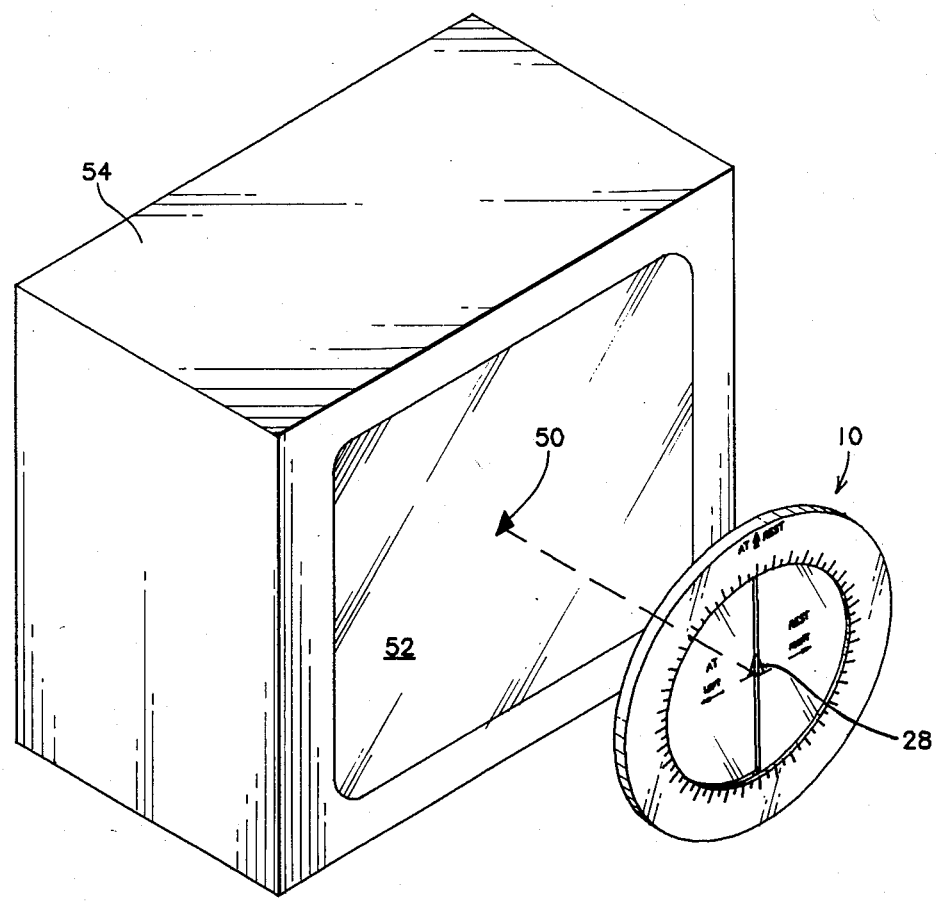
FIG. 4 is a perspective view during use of the computer graphics protractor of FIGS. 1-3.

FIGS. 4 and 5a–5h show how the graphics protractor 10 is used to determine orientation angles for the turtle arrowhead 50 on screen 52 of monitor 54. As shown in FIG. 4, the graphics protractor 10 is placed over the screen 52 with the turtle arrowhead 28 on the protractor 10 superimposed over the turtle arrowhead 50 on the screen 52 with the arrowheads 28 and 50 in a corresponding orientation.

Figure 5E:
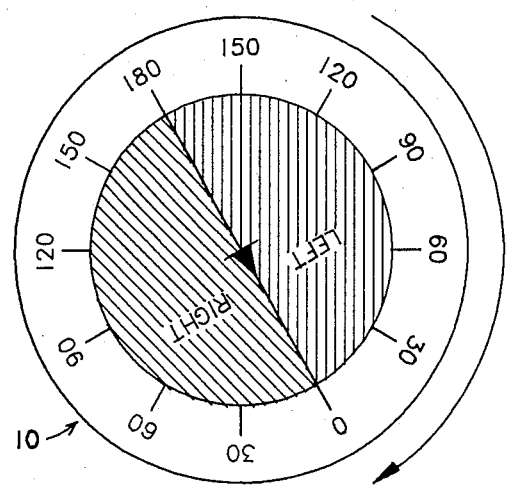
Figure 5E:
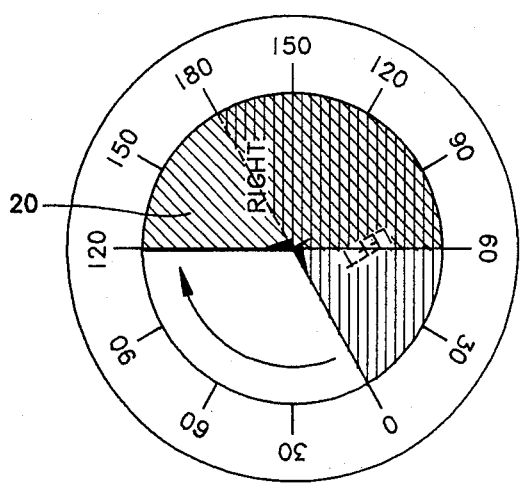
Figure 5E:
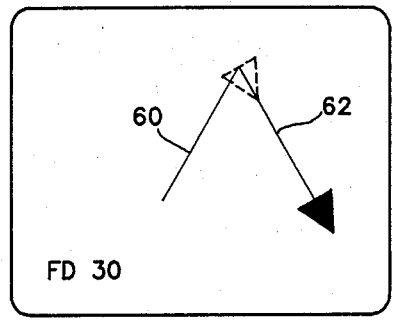
Figure 5F:
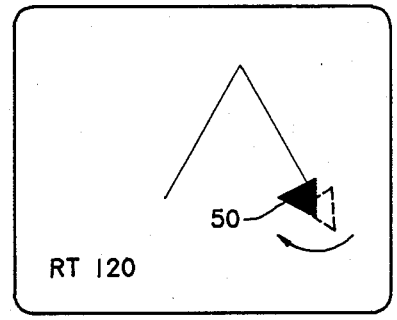

FIGS. 5a–5h show the sequence of steps for drawing a 60° equilateral triangle 56 (FIGS. 5g and 5h) on the screen 52, using the appropriate LOGO commands and the graphics protractor 10. The turtle arrowhead 50 on screen 52 is positioned at the origin of one of the angles in the triangle 56, as shown in FIG. 5a. The protractor 10 is positioned over the screen 52 with its turtle 28 over the turtle 50 and in the same orientation, and with the sheets 18 and 20 in the AT REST position. The turtles 28 and 50 are oriented to point along vertical line 22. Sheet 20 is rotated until its edge 58 extends in a direction one of the lines of the triangle 56 is to be drawn. Recalling that LOGO commands are based on the supplement to inside angles of figures to be drawn and that the turtles 28 and 50 are oriented at 90° to the vertical, the first line 60 (FIG. 5c) should extend to the right of the vertical. As shown in FIG. 5b, right sheet 20 of the protractor 10 is rotated to the right with respect to ring 12 until the proper direction for the line 60 is reached, in this case 30°. The turtle 50 is then rotated on the screen 52 so that it will point along the edge 58 of the sheet 20, by entering the LOGO command "RT 30". With the turtle as oriented in FIG. 5b, the line 60 can be drawn by entering the command "FD 30", with the "30" in this command representing arbitrary LOGO units of length. One LOGO length (known as a "turtle step") is typically equal to from about 7 to 9 millimeters, depending on the size of the monitor being used and the aspect ratio. The size of the turtle step varies in accordance with the size of the monitor being used and the aspect ratio, which is the ratio of the size of a vertical turtle step to the size of the horizontal, at which the monitor is set. Although the protractor 10 as shown in FIG. 1 includes a millimeter scale 29 the LOGO units of length could also be included or substituted for the scale. In either event, the distance scale 29 along the edge 58 can be used to determine the distance parameter for the FD command.

To orient the turtle 50 from the position shown in FIG. 5c for drawing the second line 62 (FIG. 5e) of the triangle 56, the protractor 10 is positioned over the turtle 50 with its turtle 28 in the same orientation as the turtle 50 and its sheets 18 and 20 in the AT REST position, as shown in FIG. 5c. Sheet 20 is then rotated with respect to ring 12 until edge 58 extends in the direction that line 62 is to be drawn, as shown in FIG. 5d. The edge 58 now points to the 120° angle indicia, indicating that the correct LOGO command to orient the turtle 50 is "RT 120". Entry of the FD 30 command after the orienting command then draws the line 62, as shown in FIG. 5e.

Figure 5G:
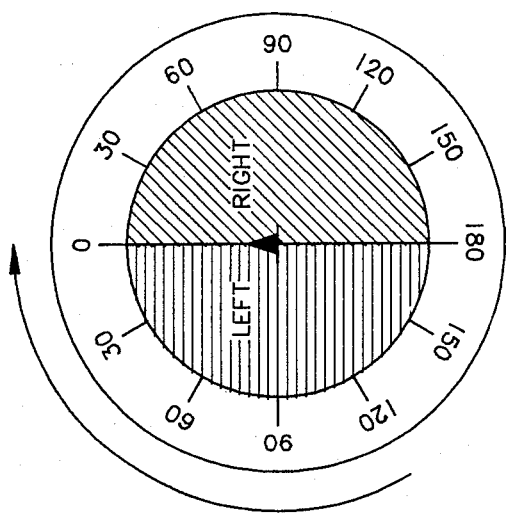
Figure 5G:
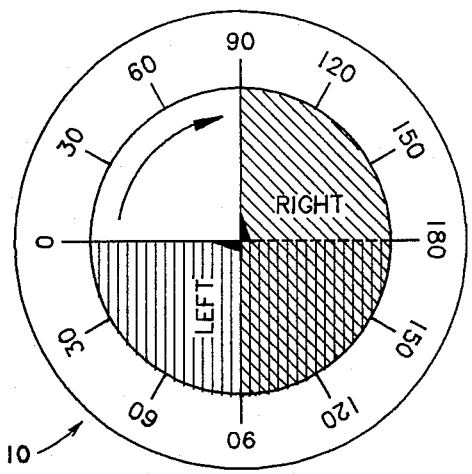
Figure 5G:
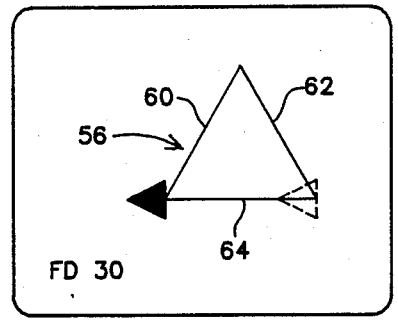
Figure 5H:
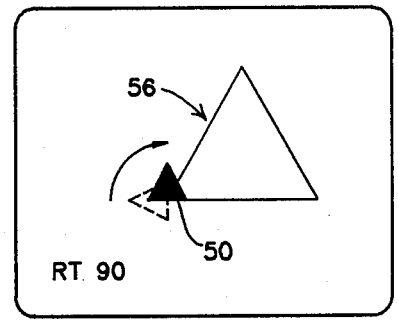

The protractor 10 is then oriented with its turtle 28 over the turtle 50 and in the same orientation as the turtle 50, for determining the angle of the next LOGO command. FIGS. 5g and 5h show how the sheet 20 is again rotated to determine the angle for the new orientation of the turtle 50 and the appropriate orientation and movement commands to draw the third line 64 of the triangle 56.

Recommended practice when using LOGO is to return the turtle 50 to its original vertical orientation after completing a desired figure. FIG. 5h shows use of the protractor 10 to determine the proper angle for doing this and the appropriate LOGO command.

The above description using a simple triangle as an example shows that the proper angles for reorienting the turtle 50 are often not intuitively apparent. For more complex drawings, the protractor 10 simplifies the determination of these angles more dramatically.

In the tool as described above, laterality is an important characteristic. The colors reinforce this characteristic. In LOGO, direction is always relative to the turtle, rather than the user or any fixed frame of reference. When used properly, the tool helps the user to remember this.

The fact that the angle is visible as a space between the two colored members is an important aspect of the tool. The semicircular cutouts in the sheets 18 and 20 allow the angles measured by the device to be felt as well. Because this tool was developed primarily for use by chldren, such visual and tactile cues are vital to proper understanding of concepts such as angle and directional measurement and laterality as related to oneself versus others.

It should now be readily apparent to those skilled in the art that a novel graphics protractor capable of achieving the stated objects of the invention has been provided. This graphics protractor allows orientation angles and/or lengths for graphics commands to be easily and reliably determined. The protractor may be color coded to conform to position significant colors in navigation.

It should further be apparent to those skilled in the art that various changes in form and details of the invention as shown and described may be made. It is intended that such changes be included within the spirit and scope of the claims appended hereto.

What is claimed is:

1. A device for placement on a computer display screen to determine direction changes for graphics commands, which comprises a circular ring bearing indicia representing degrees around the circumference of said ring relative to a point of origin on said ring, first and second members rotatable within said ring and through which at least a portion of the computer display is visible, each of said first and second members having a straight line movable into and out of registration with the straight line on the other of said first and second members by rotation of said first and second members within said ring, said first and second members bearing indicia along the straight line corresponding to a graphics symbol centrally located of said ring, said first and second members having contrasting colors and being configured so that each forms a semicircular area in one of the contrasting colors within said ring.

2. The device of claim 1 in which the straight lines of said first and second members additionally bear indicia indicating distance from the indicia corresponding to the graphics symbol, said device further being usable to determine distances for use in a graphics command for translation of a corresponding graphics symbol on the computer display screen to a desired point on the computer display screen.

3. The device of claim 1 in which the contrasting colors are red and green.

4. The device of claim 1 in which said first and second members are additionally configured so that each forms a semicircular clear area within said ring.

5. The device of claim 4 in which the semicircular areas are open.

6. A device for placement on a computer display screen to determine direction changes for graphics commands, which comprises a circular ring bearing indicia representing degrees around the circumference of said ring relative to a point of origin on said ring, first and second members rotatable within said ring and through which at least a portion of the computer display is visible, each of said first and second members having a straight line movable into and out of registration with the straight line on the other of said first and second members by rotation of said first and second members within said ring, said first and second members bearing indicia along the straight line corresponding to a graphics symbol centrally located of said ring, said ring being formed from first and second outer layers separated by an inner spacer layer, each of said first and second outer layers having an annular ring extending from an inside edge of said ring and facing said inner spacer layer, the annular rings and said inner spacer layer forming a pair of slots, said first and second members being positioned in the pair of slots for rotation within said ring.

7. The device claim 6 in which said first and second members have contrasting colors.

8. The device of claim 7 in which the contrasting colors are red and green.

9. The device of claim 7 in which said first and second members are configured so that each forms a semicircular area in one of the contrasting colors within said ring.

10. The device of claim 9 in which the straight lines of said first and second members additionally bear indicia indicating distance from the indicia corresponding to the graphics symbol, said device further being usable to determine distance for use in a graphics command for translation of a corresponding graphics symbol on the computer display screen to a desired point on the computer display screen.

11. The device of claim 6 in which said first and second members are additionally configured so that each forms a semicircular clear area within said ring.

12. The device of claim 11 in which the semicircular areas are open.

* * * * *